United States Patent

Buswell et al.

[15] 3,664,873
[45] May 23, 1972

[54] SELF-REGULATING ENCAPSULATED FUEL CELL SYSTEM

[72] Inventors: Richard F. Buswell, Glastonbury; Peter G. Nicholas, South Windsor; William J. Olsson, Glastonbury, all of Conn.

[73] Assignee: United Aircraft Corporation, East Hartford, Conn.

[22] Filed: Apr. 21, 1969

[21] Appl. No.: 817,698

[52] U.S. Cl. .................................................. 136/86 C
[51] Int. Cl. ...................................................... H01m 27/14
[58] Field of Search ............................................. 136/86 C

[56] References Cited

UNITED STATES PATENTS

| | | | |
|---|---|---|---|
| 3,150,657 | 9/1964 | Shultz, Jr. et al. | 136/86 C |
| 3,379,572 | 4/1968 | Gay | 136/86 B |
| 3,455,743 | 7/1969 | Huebscher | 136/86 C |
| 3,473,963 | 10/1969 | Sanderson et al. | 136/86 B |

Primary Examiner—Curtis Allen B.
Attorney—Edmund C. Meisinger

[57] ABSTRACT

A hydrogen and oxygen fuel cell powerplant is disclosed wherein the fuel cell is encapsulated within a sealed pressure tank for undersea applications. The system is self-regulating to compensate for variations in the venting and leaking of reactant gases. Hydrogen gas in the capsule is reacted or burned, and the resulting water vapor is condensed and collected in a tank at the bottom of the capsule. A simple method of controlling the reactant purge flow has been devised to include essentially a pressure regulator in the oxygen purge line and an orifice in the hydrogen purge line.

6 Claims, 2 Drawing Figures

PATENTED MAY 23 1972   3,664,873

INVENTORS
RICHARD F. BUSWELL
PETER G. NICHOLAS
WILLIAM J. OLSSON

BY Edmund R. Meisinger
ATTORNEY

SELF-REGULATING ENCAPSULATED FUEL CELL SYSTEM

BACKGROUND OF THE INVENTION

This invention relates to encapsulated fuel cell systems and more specifically concerns the operation and control of a hydrogen and oxygen fuel cell powerplant within a capsule for undersea applications.

Underwater exploration requires power for propulsion, communication, heat, environmental control and the like. Fuel cells can attractively supply moderate power levels for missions of intermediate duration. For the deep submergence application, the fuel cell must operate within a sealed enclosure where the primary design considerations are simplicity, safety, and reliability. In small submersibles, oxygen and hydrogen fuels stored as cryogenic fluids or as compressed gases are the most likely sources of power. It is necessary that hydrogen in the enclosure be kept below the flammability limit, and it is known to circulate the vessel atmosphere through a catalytic reactor to effect the combination of leakage hydrogen and oxygen in the vessel atmosphere into water and to condense and collect the water in a sump within the pressure container.

Providing a fuel cell system which is entirely self-contained presents numerous difficulties in the design of the components and in the system control. The selection of the reactants and the purity of the reactants present problems due to the limited space available for venting the impurities and handling of product water. Hydrogen and oxygen fuel cells require a small purge flow to flush out the impurities in the reactants which collect in the reactant chambers in the cell to prevent the impurities from degrading the cell performance. In undersea applications, there is no readily available volume in which to exhaust impure gases. It is desirable to maintain system pressure since decreasing the system pressure drastically reduces the maximum power generation.

SUMMARY OF THE INVENTION

It is an object of this invention to provide a simple method of accounting for and controlling fuel cell vent and leakage gases in undersea vehicles.

Another object of this invention is the ability of the system to react leaking gases to prevent a hazardous buildup of hydrogen within the container. Another aspect of this invention is the regulation of enclosure pressure by automatically adjusting the oxygen flow to maintain a constant capsule pressure.

Another object of this invention is the provision of a continuous fuel cell hydrogen purge whereby the hydrogen is vented past a catalytic reactor and burns in an oxygen rich atmosphere.

It has now been found that the foregoing and related objects and advantages of this invention may be readily obtained in a simple self-regulating system for venting the reactant gases to maintain constant capsule pressure and to prevent the formation of an explosive mixture within the enclosure.

In accordance with this invention, the capsule atmosphere is circulated by a fan through a catalytic reactor where hydrogen reacts with oxygen in the atmosphere to form water vapor which is subsequently condensed and stored. The system consists essentially of a circulating fan, a catalytic reactor, and a condenser. The primary purge control required is a pressure regulator. The oxygen purge flows directly into the sealed enclosure, and the hydrogen purge flows directly into a catalytic burner or a catalytic reactor. Initially, the atmosphere is an oxygen-enriched air mixture. A restriction is placed in the hydrogen vent line to provide a constant purge flow of hydrogen. The oxygen purge flow is dependent upon the pressure in the system and responds more rapidly to pressure changes in the capsule than the hydrogen vent flow. Therefore, the only control is that over the oxygen vent rate. Combustion of the vent hydrogen tends to lower the container pressure by consuming oxygen. As the capsule pressure decreases, the oxygen vent rate increases. As the capsule pressure increases, the oxygen vent rate decreases.

DESCRIPTION OF THE PREFERRED EMBODIMENT

Figure 1:
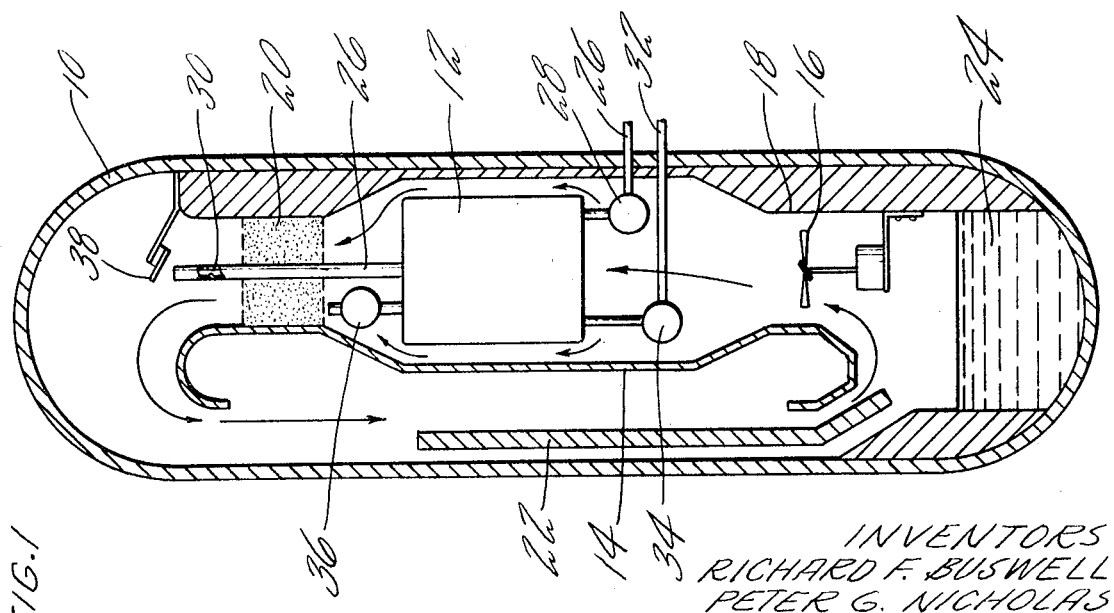
FIG. 1 is a schematic view of an encapsulated fuel cell powerplant embodying features of the present invention.

Referring briefly to FIG. 1, an encapsulated fuel cell powerplant system including the present invention is shown as having an outer casing 10 and a fuel cell module 12 disposed within the casing. Baffle 14 is fixed to and cooperates with the casing to form a duct around the fuel cell module. Fan 16 continuously circulates the atmosphere in a closed loop around the fuel cell module within the casing. Shroud 18 surrounds the fan and assists in directing the atmosphere about the fuel cell module. The fan circulates the atmosphere past the fuel cell module and through a catalytic reactor 20 where any hydrogen leakage or buildup in the atmosphere is reacted with air in the oxygen-enriched air atmosphere to form water vapor or steam. The heat produced by the chemical reaction of hydrogen is carried with the atmosphere and is rejected in the condenser 22 where the water vapor or steam formed in the catalytic reactor 20 is condensed to form water which drains off into the condensate tank 24. Heat is removed from the wall-cooled condenser 22 by transfer to the sea water on the outside of the casing 10.

Hydrogen is supplied through conduit 26 to the pressure regulator 28 and thereafter to the anode compartments of the fuel cell module 12. An orifice 30 is placed in conduit 26 to provide a constant hydrogen purge flow through the fuel cell and out into the capsule. Oxygen is supplied to the fuel cell on demand at a constant pressure by conduit 32 and pressure regulator 34. A variable oxygen purge rate is controlled by the vent pressure regulator 36 which attempts to hold a constant environmental pressure at a level slightly below the fuel cell module gas pressure. The two pressure regulators are sized such that constant oxygen pressure can be maintained in the fuel cell module independent of the oxygen consumption and purge rates.

Operation of the module vent system requires means for controlling the vent flow rates. The primary requirement is that the oxygen vent flow must automatically match the hydrogen vent flow. If the oxygen vent flow is too high, there will be a gradual increase in the capsule pressure with time. If the oxygen vent rate is too low, an excessive amount of oxygen in the container will be consumed by reaction with the hydrogen and the enclosure pressure will gradually decrease. The use of the oxygen vent or purge pressure regulator 36 and the proper sizing of the orifice 30 in the hydrogen vent line provide a simple method of controlling the vent flows. Typically, the orifice in the hydrogen vent line is sized so that about 3 percent of the hydrogen flow at the maximum power condition is continually vented to the capsule. This hydrogen vent flow is ducted to a hydrogen vent burner through tube 26. The vent burner includes some catalyst 38 in the region where the hydrogen mixes with the atmosphere. The catalyst reacts some of the vent hydrogen causing the catalyst to heat up above the spontaneous ignition temperature of hydrogen. A flame flashes back from the catalyst to the tube and the burner is ignited. Granular supported platinum is a particularly suitable catalyst due to its high activity and stability at low temperatures.

A single catalytic reactor could be utilized if hydrogen were vented ahead of the reactor 20. The advantage of a catalytic reactor coupled with a catalytic burner lies in the reduction of atmosphere circulation rate resulting in lower parasite power losses. In addition, temperature rise across the catalytic reactor is a simple indicator of hydrogen leak rate; and temperature rise across the catalytic burner indicates hydrogen purge rate.

The oxygen purge line is sized so that it has a very small pressure drop. Thus, a slight change in the enclosure pressure is responded to rapidly by large changes in the oxygen vent flow but only by small changes in the hydrogen vent flow. The hydrogen vent flow line has a restriction such that the hydrogen flow does not vary significantly when the pressure changes are small. The orifice placed in the hydrogen purge line is sized so that the pressure drop from the hydrogen line to the enclosure is approximately 5 to 10 times that of the pressure drop in the oxygen purge line.

Figure 2:
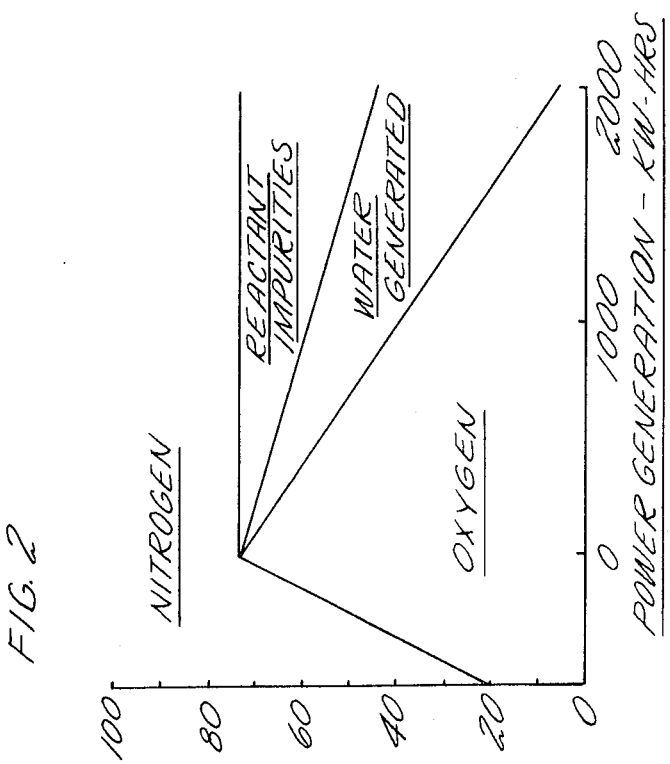
FIG. 2 graphically illustrates the effect of operation on the atmosphere with the capsule.

The effect of operation on the capsule atmosphere is illustrated in FIG. 2. It is assumed that the free volume in the enclosure including the volume of the condensate tank initially contains air at 14.7 psia. The capsule pressure may be between 0 and 100 psig with the optimum about 50 psig. Initially, the free volume contains essentially 80 percent nitrogen and 20 percent oxygen. The capsule is pressurized to about 50 psig with oxygen thereby compressing the nitrogen until the free volume contains essentially 75 percent oxygen. As the fuel cell generates electrical power, water is generated, condensed, and accumulated in the tank 24 thereby reducing the gas volume of the enclosure. The purge system maintains a constant pressure within the enclosure by automatically reducing the oxygen purge rate flow. Oxygen in the enclosure is consumed with time causing a reduction in the volume of oxygen as shown in FIG. 2. The purge system operates until all of the oxygen in the enclosure has been consumed and the initial volume of oxygen is replaced by water in the condensate tank and reactant impurities. Power generation beyond this point cannot be assured, and the maximum power generation limit may be defined as occurring when the oxygen within the capsule is depleted. Maximum power generation can be increased by increasing the size of the water condensate tank or increasing the free volume within the container or reducing reactant impurity levels. Decreasing the initial oxygen concentration of the enclosure reduces the maximum power generation capability.

Cooling of the fuel cell module may be accomplished by circulating a liquid coolant, for example, through the fuel cell and through a heat exchanger where heat is transferred to the sea water. A separate system may be provided to remove the reactant water from the fuel cell module and to deposit the reactant water in the condensate tank 24.

Although the invention has been shown and described with respect to a preferred embodiment, it should be understood by those skilled in the art that various changes and omissions in the form and detail may be made therein without departing from the spirit and the scope of the invention.

We claim:

1. An encapsulated fuel cell powerplant system comprising:
   an outer casing:
   a hydrogen and oxygen fuel cell module disposed within the casing;
   a baffle fixed to the casing and a fan for circulating the atmosphere in a closed loop within the casing past the fuel cell module;
   a catalytic reactor disposed downstream of the fuel cell module whereby any hydrogen accumulating in the circulating atmosphere will be reacted with oxygen;
   means for supplying hydrogen to the fuel cell module and a vent from the module having a restriction thereby exhausting a fixed rate of hydrogen downstream of the catalytic reactor;
   means for consuming vent hydrogen;
   means for supplying oxygen to the fuel cell module and means for regulating the oxygen vent flow from the module to maintain a constant pressure within the casing; and
   a condenser whereby water vapor in the circulating atmosphere condenses and drains into a condensate tank.

2. A system as in claim 1, wherein the circulating atmosphere intially is oxygen enriched air.

3. A system as in claim 2, wherein the catalytic reactor bed contains granular supported platinum catalyst pellets.

4. A system as in claim 3, wherein the means for regulating the oxygen vent flow is a downstream pressure regulator.

5. A system as in claim 3, wherein the means includes a catalytic igniter for consuming vent hydrogen.

6. An encapsulated fuel cell power plant system as defined in claim 1 wherein said means for regulating the oxygen vent flow from the module comprises an oxygen vent line from said module to the interior of said outer casing sized to maintain a low pressure drop between said fuel cell module and the interior of said outer casing including pressure regulating means to control the vent oxygen to maintain a predetermined pressure in said module, and wherein said restriction in said hydrogen vent comprises an orifice sized so that the pressure drop between said fuel cell module and the interior of said outer casing is about 5 to 10 times the pressure drop in the oxygen vent line.

* * * * *